United States Patent
List et al.

(10) Patent No.: US 11,335,203 B1
(45) Date of Patent: May 17, 2022

(54) METHODS AND SYSTEMS FOR VOICE RECOGNITION IN AUTONOMOUS FLIGHT OF AN ELECTRIC AIRCRAFT

(71) Applicant: BETA AIR, LLC, South Burlington, VT (US)

(72) Inventors: Alexander Hoekje List, South Burlington, VT (US); Vincent Moeykens, Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/407,605

(22) Filed: Aug. 20, 2021

(51) Int. Cl.
| | |
|---|---|
| G08G 5/00 | (2006.01) |
| G10L 15/22 | (2006.01) |
| G06F 16/63 | (2019.01) |
| G06F 16/61 | (2019.01) |
| G06N 20/00 | (2019.01) |
| G10L 15/26 | (2006.01) |

(52) U.S. Cl.
CPC .......... *G08G 5/0039* (2013.01); *G06F 16/61* (2019.01); *G06F 16/63* (2019.01); *G06N 20/00* (2019.01); *G08G 5/0069* (2013.01); *G10L 15/22* (2013.01); *G10L 15/26* (2013.01); *G10L 2015/223* (2013.01)

(58) Field of Classification Search
CPC .... G08G 5/0039; G08G 5/0069; G06F 16/61; G06F 16/63; G06N 20/00; G10L 15/22; G10L 15/26; G10L 2015/223
See application file for complete search history.

(56) References Cited

U.S. PATENT DOCUMENTS

| | | | |
|---|---|---|---|
| 8,417,396 B2 | 4/2013 | Goodman et al. | |
| 9,401,758 B2 | 7/2016 | Bosworth | |
| 9,442,496 B1* | 9/2016 | Beckman | G10K 11/17821 |
| 10,140,987 B2 | 11/2018 | Erickson et al. | |
| 10,310,617 B2 | 6/2019 | Ekandem et al. | |
| 10,787,255 B2 | 9/2020 | George | |
| 10,800,039 B2 | 10/2020 | Tan et al. | |
| 10,809,712 B1 | 10/2020 | Schaffalitzky | |
| 2009/0288064 A1* | 11/2009 | Yen | G06N 20/00 717/106 |
| 2017/0193049 A1* | 7/2017 | Grehant | G06F 16/22 |
| 2017/0193402 A1* | 7/2017 | Grehant | G06N 20/00 |

(Continued)

OTHER PUBLICATIONS

Ruben Contreras, Angel Ayala, and Francisco Cruz, Unmanned Aerial Vehicle Control through Domain-Based Automatic Speech Recognition, Aug. 5, 2020.

*Primary Examiner* — Bhavesh V Amin
(74) *Attorney, Agent, or Firm* — Caldwell Intellectual Property Law; Keegan Caldwell; Charles Dresser

(57) ABSTRACT

A system for voice recognition in autonomous flight of an electric aircraft that includes a computing device communicatively connected to the electric aircraft configured to receive at least a voice datum from a remote device, wherein the voice datum is configured to include at least an expression datum, generate, using a first machine-learning process, a transcription datum as a function of the at least a voice datum, extract at least a query as a function of the transcription datum, generate, using a second machine-learning process, a communication output as a function of the at least a query, and adjust a flight plan as a function of the communication output.

20 Claims, 8 Drawing Sheets

(56) References Cited

U.S. PATENT DOCUMENTS

| | | | |
|---|---|---|---|
| 2017/0270674 A1* | 9/2017 | Shrivastava | G06K 9/00771 |
| 2017/0294027 A1* | 10/2017 | Babenko | G06K 9/2054 |
| 2018/0237137 A1 | 8/2018 | Tovey et al. | |
| 2018/0284758 A1* | 10/2018 | Cella | G06Q 10/04 |
| 2018/0300964 A1* | 10/2018 | Lakshamanan | G01C 21/3492 |
| 2018/0306609 A1* | 10/2018 | Agarwal | H04W 4/38 |
| 2018/0322406 A1* | 11/2018 | Merrill | G06N 20/20 |
| 2018/0336652 A1* | 11/2018 | Wani | G06Q 50/265 |
| 2018/0374105 A1* | 12/2018 | Azout | G06N 3/08 |
| 2019/0025858 A1* | 1/2019 | Bar-Nahum | B64D 47/08 |
| 2019/0086988 A1* | 3/2019 | He | G06N 20/00 |
| 2019/0095946 A1* | 3/2019 | Azout | G06N 20/00 |
| 2019/0121350 A1* | 4/2019 | Celia | H04L 67/12 |
| 2019/0121673 A1* | 4/2019 | Gold | G06T 1/20 |
| 2019/0122073 A1* | 4/2019 | Ozdemir | A61B 6/5217 |
| 2019/0215424 A1* | 7/2019 | Adato | G06Q 50/28 |
| 2019/0228309 A1* | 7/2019 | Yu | G06N 3/0454 |
| 2021/0055722 A1 | 2/2021 | Wang et al. | |

\* cited by examiner

METHODS AND SYSTEMS FOR VOICE RECOGNITION IN AUTONOMOUS FLIGHT OF AN ELECTRIC AIRCRAFT

FIELD OF THE INVENTION

The present invention generally relates to the field of electric aircraft. In particular, the present invention is directed to methods and systems for voice recognition in autonomous flight of an electric aircraft.

BACKGROUND

Communication between an aircraft and ground control ensures safety in air travel, but in an autonomous flight a human operator may often have to change the flight plan for the autonomous aircraft based on information from ground control, such as air traffic control or a fleet operator. It is desirable that an autonomous electric aircraft be able to adjust its flight path automatically based on information relayed by ground control. The autonomous electric aircraft being capable of also communicating changes in the flight plan further reduces the need for human intervention.

SUMMARY OF THE DISCLOSURE

In an aspect a system for voice recognition in autonomous flight of an electric aircraft that includes a computing device communicatively connected to the electric aircraft configured to receive at least a voice datum from a remote device, wherein the voice datum is configured to include at least an expression datum, generate, using a first machine-learning process, a transcription datum as a function of the at least a voice datum, extract at least a query as a function of the transcription datum, generate, using a second machine-learning process, a communication output as a function of the at least a query, and adjust a flight plan as a function of the communication output.

In another aspect a method for voice recognition in autonomous flight of an electric aircraft that includes receiving, by a computing device, at least a voice datum from a remote device, wherein the voice datum is configured to include at least an expression datum, generating, by the computing device, using a first machine-learning process, a transcription datum as a function of the at least a voice datum, extracting, by the computing device, at least a query as a function of the transcription datum, generating, by the computing device, using a second machine-learning process, a communication output as a function of the at least a query, adjusting, by the computing device, a flight plan as a function of the communication output.

In another aspect a system for voice recognition in autonomous flight of an electric aircraft that includes a computing device communicatively connected to the electric aircraft configured to receive at least a voice datum from a remote device, wherein the voice datum is configured to include at least an expression datum, extract at least a query as a function of the voice datum, generate, using a second machine-learning process, a communication output as a function of the at least a query, and adjust a flight plan as a function of the communication output These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for voice recognition in autonomous light in an electric aircraft. In an embodiment, the electric aircraft includes a computing device that is configured to receive audio signal in the form of voice, generate a transcript of the voice data by using machine learning process, extract at least a query from the transcription, generate a communication output from the query and use it to adjust its flight plan. In another embodiment, computing device is configured to extract the at least a query directly from the voice datum.

Aspects of the present disclosure can be used to automatically change an electric aircraft's flight plan without human intervention. Aspects of the present disclosure can also be used to relay information related to changing the flight plan back to air traffic control, or a fleet operator. This is so, at least in part, because system is configured to send a response based on the communication generated from the radio transmissions.

Aspects of the present disclosure allow for sending information related to the changes made to the flight plan to a remote device. Exemplary embodiments illustrating aspects of the present disclosure are described below in the context of several specific examples.

Figure 1:
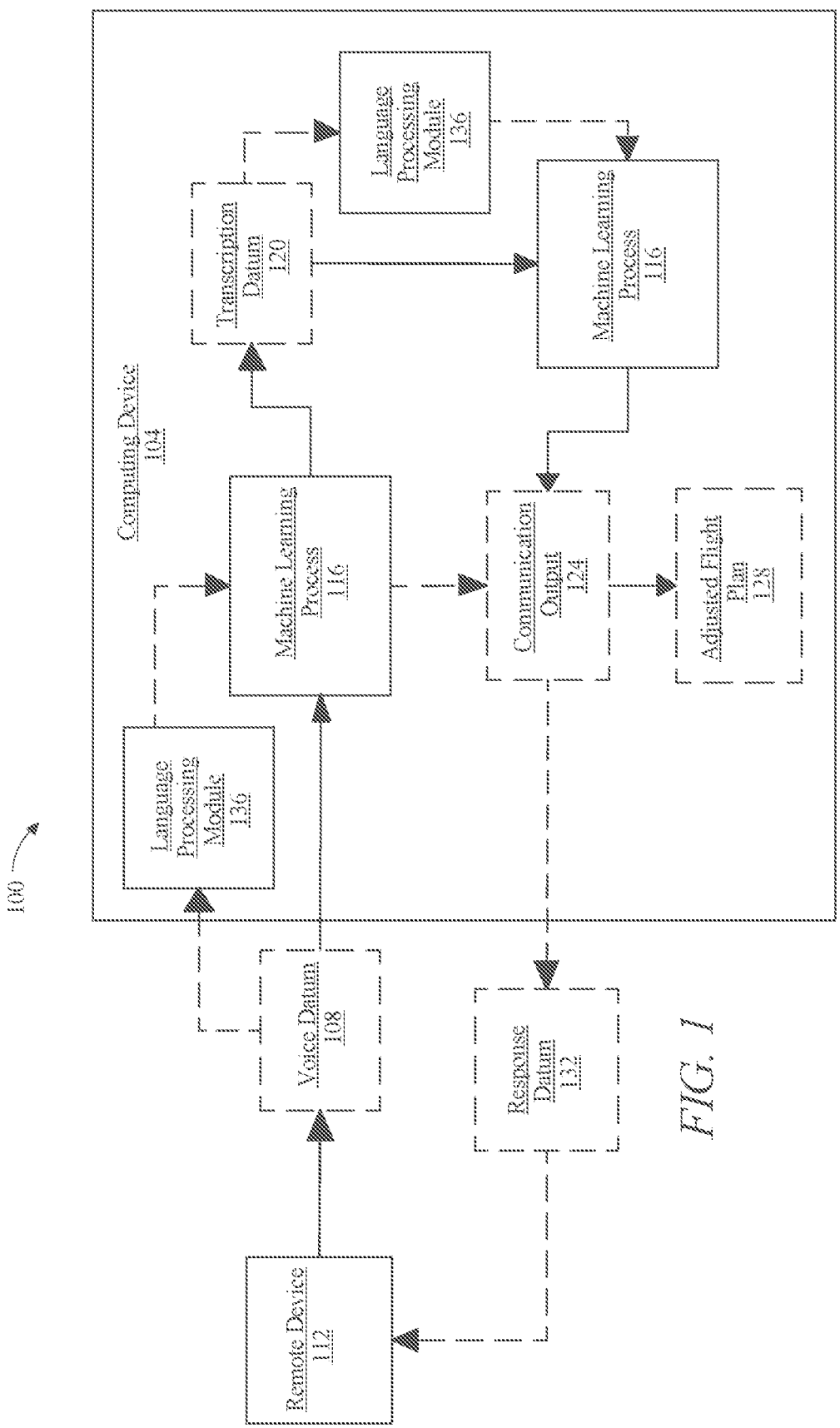
FIG. 1 is a block diagram illustrating a system for voice recognition in autonomous flight of an electric aircraft.

Referring now to FIG. 1, an exemplary embodiment of a system 100 for voice recognition in autonomous flight of an electric aircraft is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. In embodiments, computing device 104 may be a flight controller. Flight controller is described in detail further below.

Still referring to FIG. 1, computing device 104 is configured to receive at least a voice datum 108 from a remote device 112, wherein the voice datum 108 is configured to include at least an expression datum. "Datum", for the purposes of this disclosure, refers to at least an element of data identifying and/or a user input or command. "Voice datum" refers to audio signal received in voice format, such as communication between air traffic controller and airplanes, which may include analog or digital audio signal. "Expression datum" refers to sections of the voice datum that have actionable meaning, such as a command to increase altitude. In an embodiment, voice datum is received through a radio signal. Radio signals may be received through analog voice transmission, such as very high frequency (VHF) or high frequency (HF) radio waves, VHF Digital Link Mode 2 (VDL-2), 3G signal, 4G signal, 5G signal, or any type of transmission suitable for transmitting audio signals. "Remote device" refers to any device that is located outside the computing device 104. Remote device may include air traffic control, fleet operator, a remote user, and the like. "User" for the purpose of this disclosure refers to a human that has access to the data transmitted by the system 100. In nonlimiting examples, a user may be a fleet operator, an air traffic controller, a person using the automated electric aircraft for personal use, and the like.

Continuing to refer to FIG. 1, computing device 104 is configured to generate, using a first machine-learning process 116, a transcription datum 120 as a function of the at least a voice datum 108. "Transcription datum" refers to a textual representation of the voice datum. In an embodiment, transcription datum may only include expression datum in textual form. Textual form may include any alphanumerical symbols, or any commonly used symbols, such as "=" for equal. In a nonlimiting example, transcription datum may be expression datum that includes instructions relayed by air traffic control related to a flight path, such as instructions to stand by for authorization to land or instructions to change altitude due to a nearby airplane flight path. "First machine-learning process" refers to the first machine learning process used and includes any machine learning process described in this disclosure. Machine learning model is described in detail further below.

With continued reference to FIG. 1, computing device 104 is configured to extract at least a query as a function of the transcription datum 120. The computing device 104 is also configured to extract at least a query from the at least a voice datum. As a nonlimiting example, an expression datum relating to a command, such as to increase altitude, extracted from the transcription datum 120, or voice datum 108, may be matched to a dataset contained within a database that is categorized as belonging to a category of maneuvers, such as reducing throttle. In another nonlimiting example, a voice datum that includes an expression datum describing an area of incremented weather may be matched to a dataset containing instructions to change flight direction that avoids the area. "At least a query", as used in this disclosure, is at least a datum used to retrieve text, or audio, that will be incorporated in at least a textual, or audio, output, where retrieval may be affected by inputting the at least a query into a data structure, database, and/or model, and receiving a corresponding output as a result.

Still referring to FIG. 1, computing device 104 is configured to generate, using a second machine-learning process 116, a communication output 124 as a function of the at least a query. "Communication output" refers to instructions or maneuvers that are configured to alter a flight plan 128. "Flight plan", for the purpose of this disclosure, refers to the optimum set of maneuvers, or commands, to be performed by the automated electric aircraft in order to reach a set objective. Flight plan may be consistent with disclosure of flight plan in U.S. patent application Ser. No. 17/365,512 and titled "PILOT-CONTROLLED POSITION GUIDANCE FOR VTOL AIRCRAFT", which is incorporated herein by reference in its entirety. Machine learning process 116 used to generate the communication output 124 may be any machine learning process, or model, described herein. "Second machine-learning process" refers to the second machine learning process used and includes any machine learning process described in this disclosure. Machin learning model is described in detail further below.

Continuing to refer to FIG. 1, computing device 104 is configured to adjust a flight plan 128 as a function of the communication output 124. In an embodiment, computing device 104 may be configured to generate a response datum 132 as a function of the communication output 124, and transmit to the remote device 112. "Response datum" refers to the commands used to adjust the flight plan 128 in audio format. In embodiments, computing device 104 may be configured to transmit an adjustment notification to a user interface device as a function of adjusting the flight plan. In an embodiment, system 100 may include a user interface device, wherein the user interface device is configured to display the adjustment notification to a use. "User interface device" refers to any computing device configured to relay information to a user. In nonlimiting examples, user interface device includes smartphones, one-way radios, two-way radios, laptops, pagers, PDAs, braille displays, and the like. In embodiments, computing device 104 may be configured to transmit the transcription datum 120 to a user interface device. "Adjustment notification" refers, for the purpose of this disclosure, to an information generated as a function of the communication output 124 that differs from the flight plan. In a nonlimiting example, a flight plan may have a specific altitude set for the aircraft and when the automated electric aircraft changes its altitude based on the communication datum 124, a notification of the change in altitude is sent to a user interface device, such as a computer operated by ground control.

Alternatively, or additionally, generating the transcription datum 120 may further include selecting a correlated dataset containing a plurality of data entries wherein each dataset contains at least a datum of expression data and at least a first correlated content datum as a function of the at least a voice datum, and generating, at a clustering unsupervised machine-learning model, a transcription datum as a function of the at least a voice datum and the correlated dataset. In an embodiment, generating the communication output 124 may include receiving, at a supervised machine-learning model, a first training set as a function of the at least a voice datum and the at least a query, and generating, at a supervised machine-learning model, a communication output as a function of relating the at least a query to at least a textual output. In embodiments, receiving the voice datum may include storing the voice datum in a database. At least a textual output as used in this disclosure, refers to an output that includes alphanumerical characters in any natural language. At least a textual output may also include commonly used symbols, or abbreviations, such as symbols that are used to describe "greater/lesser than", equal signs, arrows describing increases/decreases, and the like.

Additionally, or alternatively, and still referring to FIG. 1. The at least a query may be extracted at a language processing module 136. Language processing module 136 may include any hardware and/or software module, such as a processor, memory, field-programmable gate array (FPGA), microprocessor, controller, microcontroller, graphics processing unit, central processing unit, and the like. Language processing module 136 may be configured to extract from the one or more documents, one or more words. One or words may include, without limitation, strings of one or characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module 136 may compare extracted words to categories of data recorded by the computing device 104, and/or one or more categories of compatible elements recorded by the computing device 104; such data for comparison may be entered on the server 104 using manufacturing request datum and the like. In an embodiment, one or more categories may be enumerated, to find total count of mentions in such documents.

Alternatively or additionally, language processing module 136 may operate to produce a language processing model. Language processing model may include a program generated the computing device 104 and/or language processing module 136 to produce associations between one or more words extracted from at least a voice datum 108, or transcription datum 120, and detect associations, including without limitation mathematical associations, between such words, and/or associations of extracted words with categories of user input datums, relationships of such categories to first probing elements, and/or categories of first probing elements. Associations between language elements, where language elements include for purposes herein extracted words, categories of user input datums, relationships of such categories to first probing elements, and/or categories of first probing elements may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of user input datum, a given relationship of such categories to a first probing element, and/or a given category of a first probing element. As a further example, statistical correlations and/or mathematical associations may include probabilistic formulas or relationships indicating a positive and/or negative association between at least an extracted word and/or a given category of mechanical part data, a given relationship of such categories to compatible part element, and/or a given category of compatible part element; positive or negative indication may include an indication that a given document is or is not indicating a category of mechanical part data, relationship of such category to a first compatible part element, and/or category of compatible part element is or is not significant. For instance, and without limitation, a negative indication may be determined from a phrase such as, "Aircraft is descending too fast" whereas a positive indication may be determined from a phrase such as, "Permission to land has been granted." A phrase, sentence, word, or other textual element in a document or corpus of documents constituting a positive or negative indicator may be determined, in an embodiment, by mathematical associations between detected words, comparisons to phrases and/or words indicating positive and/or negative indicators, are stored in memory by the computing device 104, or the like.

Continuing to refer to FIG. 1, language processing module 136 and/or computing device 104 may generate the language processing model by any suitable method, including without limitation, a natural language processing classification algorithm. The language processing model may include a natural language process classification model that enumerates and/or derives statistical relationships between input term and output terms. An algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted word category of mechanical part, a given relationship of such categories to compatible part elements, and/or a given category of compatible part elements. An HMM inference algorithm, such as the forward-backward algorithm or the Viterbi algorithm, may be used to estimate the most likely discrete state given a word or sequence of words. Language processing module 136 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating a language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 136 may parse the voice datum 108, or transcription datum 120, for the element of the communication and match the element of the communication to a correlated dataset containing at least an element of the communication. In an embodiment, datasets contained within a database may be categorized by SID/STAR phraseology. Language processing module 136 may match at least a dataset by extracting one or more keywords containing words, phrases, test results, numerical scores, and the like from voice datum 108, or transcription datum 120, and analyze the one or more keywords, as described in more detail below. Language processing module 136 may be configured to normalize one or more words or phrases of user input, where normalization signifies a process whereby one or more words or phrases are modified to match corrected or canonical forms. For instance, misspelled words may be modified to correctly spelled versions, words with alternative spellings may be converted to spellings adhering to a selected standard, such as American or British spellings, capitalizations and apostrophes may be corrected, and the like; this may be performed by reference to one or more "dictionary" data structures listing correct spellings and/or common misspellings and/or alternative spellings, or the like.

With continued reference to FIG. 1, language processing module 136 may extract and/or analyze one or more words or phrases by performing dependency parsing processes. A dependency parsing process may be a process whereby language processing module 136 recognizes a sentence or clause and assigns a syntactic structure to the sentence or clause. Dependency parsing may include searching for or detecting syntactic elements such as subjects, objects, predicates or other verb-based syntactic structures, common phrases, nouns, adverbs, adjectives, and the like. Such detected syntactic structures may be related to each other using a data structure and/or arrangement of data corresponding, as a non-limiting example, to a sentence diagram, parse tree, or similar representation of syntactic structure. Language processing module 136 may be configured, as part of dependency parsing, to generate a plurality of representations of syntactic structure, such as a plurality of parse trees, and select a correct representation from the plurality; this may be performed, without limitation, by use of syntactic disambiguation parsing algorithms such as, without limitation, Cocke-Kasami-Younger (CKY), Earley algorithm or Chart parsing algorithms. Disambiguation may alternatively or additionally be performed by comparison to representations of syntactic structures of similar phrases as detected using vector similarity, by reference to machine-learning algorithms and/or modules.

Figure 2:
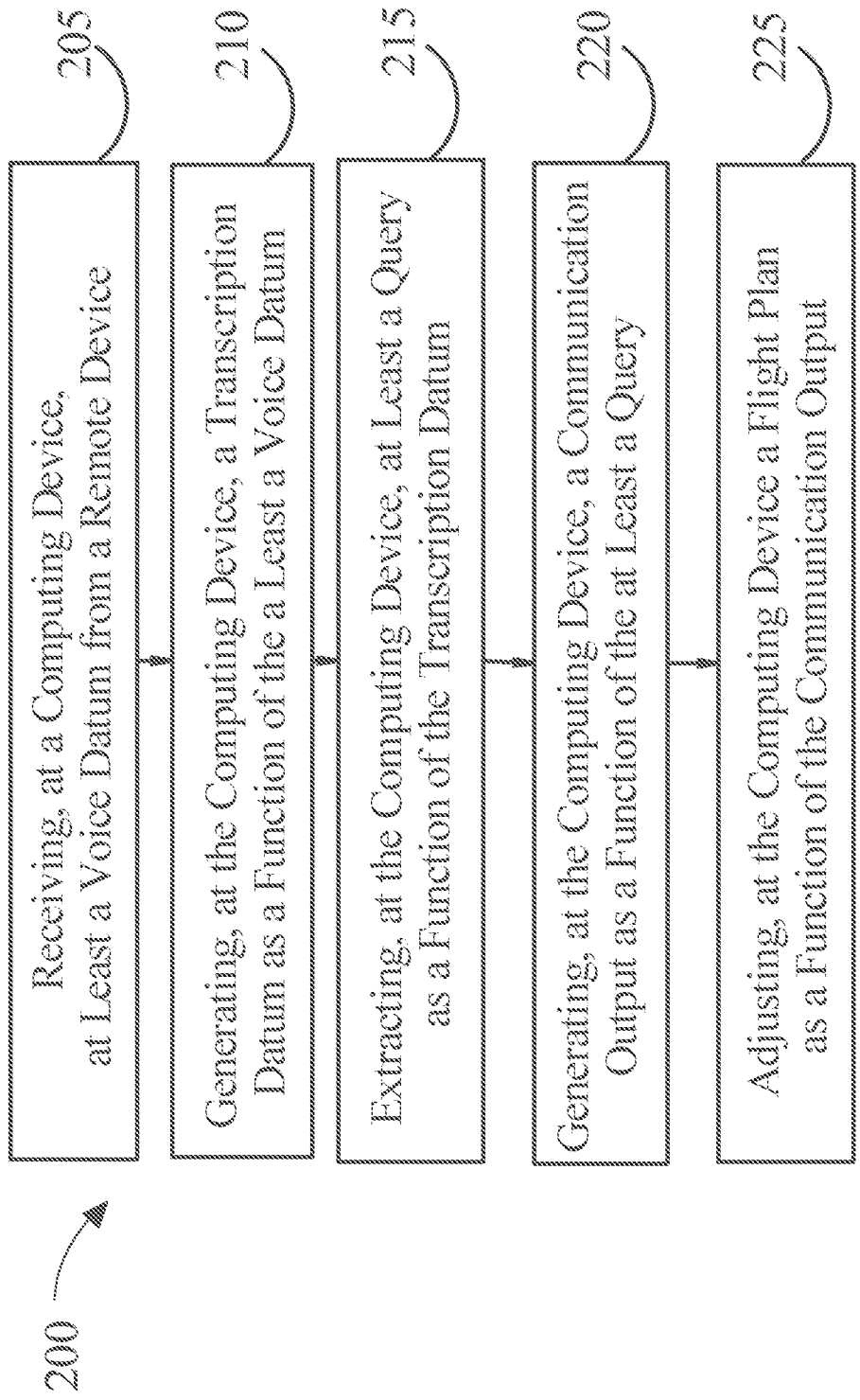
FIG. 2 is a flow diagram illustrating a method for voice recognition in autonomous flight of an electric aircraft.

Now referring to FIG. 2, an exemplary embodiment of method 200 is illustrated. At step 205, method 200 includes receiving, by a computing device 104, at least a voice datum 108 from a remote device 112, wherein the voice datum 108 is configured to include at least an expression datum. In a nonlimiting example, receiving the voice datum 108 may be a broadcast from ground control with instructions for the aircraft.

Still referring to FIG. 2, method 200, at step 210, includes generating, by the computing device 104, using a first machine-learning process 116, a transcription datum 120 as a function of the at least a voice datum 108. In a nonlimiting example, generating the transcription datum 120 may include using a voice-to-text machine learning feature that transcribes voice data into text data.

Continuing to refer to FIG. 2, at step 215, method 200 includes extracting, by the computing device 104, at least a query as a function of the transcription datum 120. In embodiments, method 200 may include transmitting, by the computing device 104, the transcription datum 120 to a user interface device. In a nonlimiting example, the at least a query may be keywords referring to specific commands for the aircraft being relayed by ground control, such as commands to change altitude or direction. In another nonlimiting example, computing device 104 may transmit the transcribe data to a fleet operator to a device such as a smartphone.

With continued reference to FIG. 2, method 200, at step 220, includes generating, by the computing device 104, using a second machine-learning process 116, a communication output 124 as a function of the at least a query. In a nonlimiting example, the communication output 124 may be instructions to change a flight plan, such as a change in direction.

Still referring to FIG. 2, at step 225, method 200 includes adjusting, by the computing device 104, a flight plan 128 as a function of the communication output 124. In an embodiment, method 200 may include transmitting, by the computing device 104, an adjustment notification to a user interface device as a function of adjusting the flight plan 128. In other embodiments, method 200 may include displaying, by the user interface device, the adjustment notification to a user. In a nonlimiting example, the automated electric aircraft may make modifications to its flight plan automatically based on the instructions generated, which may be the communication output 124. In another nonlimiting example, changes to a flight plan that are performed automatically based on the communication output 124 may be sent to a fleet operator, which enables the fleet operator to know the updated flight plan for the automated electric aircraft.

Alternatively, or additionally, generating the transcription may include selecting a correlated dataset containing a plurality of data entries wherein each dataset contains at least a datum of expression data and at least a first correlated content datum as a function of the at least a voice datum, and generating, at a clustering unsupervised machine-learning model, a transcription datum as a function of the at least a voice datum and the correlated dataset. In an embodiment, the at least a query may be extracted at a language processing module 136, as described above. In an embodiment, generating the communication output may further include receiving, at a supervised machine-learning model, a first training set as a function of the at least a voice datum and the at least a query, and generating, at a supervised machine-learning model, a communication output as a function of relating the at least a query to at least a textual output. Unsupervised and supervised machine learning models are described further below.

Additionally, or alternatively, in an embodiment, method 200 may further include generating, by the computing device 104, a response datum 132 as a function of the communication output 124, and transmitting, by the computing device 104, the response datum 132 to the remote device 112. In embodiments, receiving the voice datum further includes storing the voice datum 108, as a dataset, in a database. In embodiments, method 200 further includes training the machine learning model as a function of the voice datum dataset.

Figure 3:
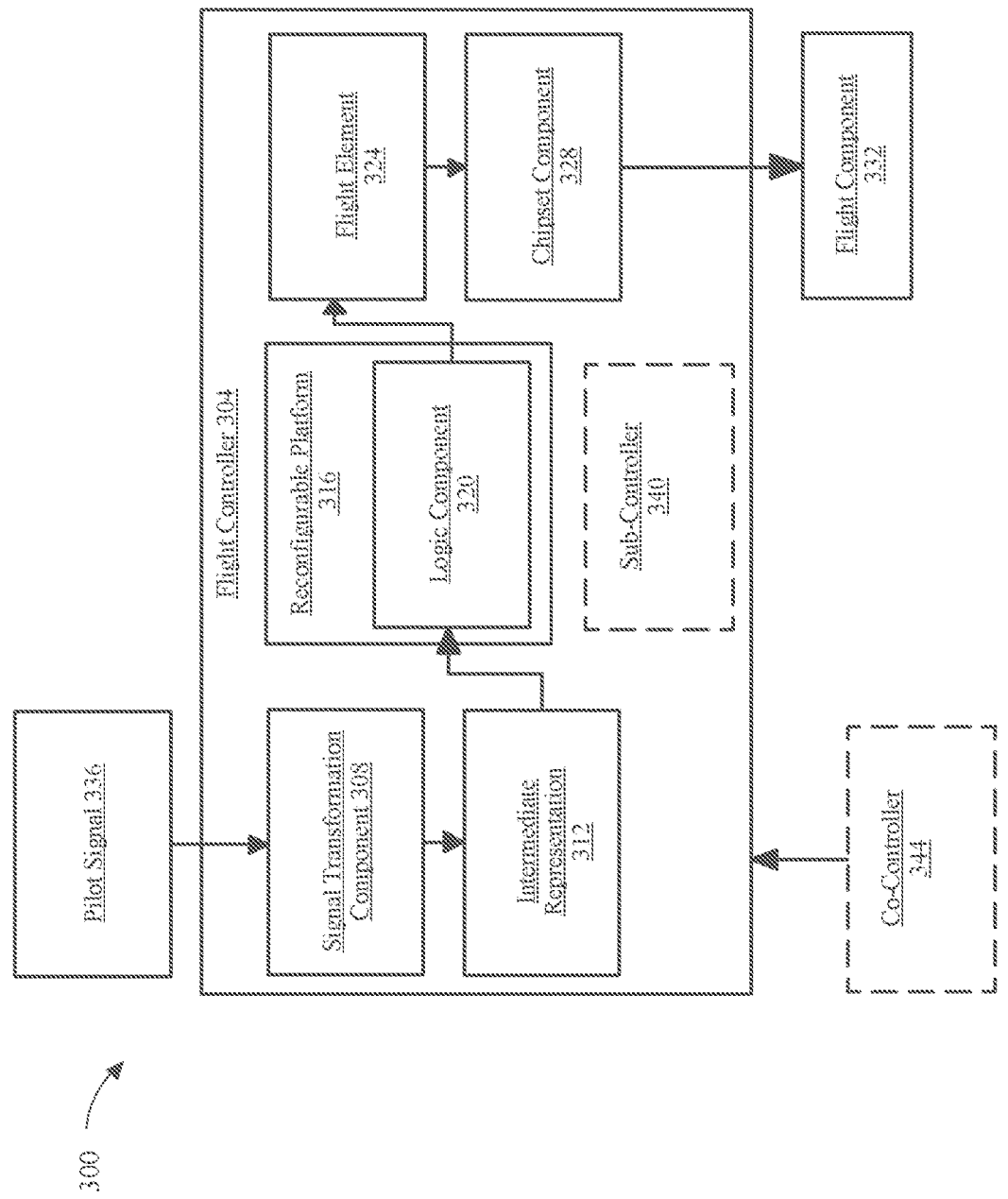
FIG. 3 is an exemplary diagram of a flight controller.

Now referring to FIG. 3, an exemplary embodiment 300 of a flight controller 304 is illustrated. As used in this disclosure a "flight controller" is a computing device of a plurality of computing devices dedicated to data storage, security, distribution of traffic for load balancing, and flight instruction. Flight controller 304 may include and/or communicate with any computing device as described in this disclosure, including without limitation a microcontroller, microprocessor, digital signal processor (DSP) and/or system on a chip (SoC) as described in this disclosure. Further, flight controller 304 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller 304 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 304. For example, and without limitation, native machine language may include one or more binary and/or numerical languages.

In an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 304 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 304. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller 304 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 332. As used in this disclosure a "flight component" is a portion of an aircraft that can be moved or adjusted to affect one or more flight elements. For example, flight component 332 may include a component used to affect the aircrafts' roll and pitch which may comprise one or more ailerons. As a further example, flight component 332 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 304 may be configured generate an autonomous function. As used in this disclosure an "autonomous function" is a mode and/or function of flight controller 304 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 304 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 304 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 304 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 304 to control and/or maintain a portion of aircraft, a portion of the flight plan, the entire aircraft, and/or the entire flight plan. As a further non-limiting example, pilot signal 336 may include an implicit signal, wherein flight controller 304 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 304 and/or a remote device may or may not use in the generation of autonomous function. As used in this disclosure "remote device" is an external device to flight controller 304. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 304 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 304 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 304. Remote device and/or FPGA may transmit a signal, bit, datum, or parameter to flight controller 304 that at least relates to autonomous function. Additionally or alternatively, the remote device and/or FPGA may provide an updated machine-learning model. For example, and without limitation, an updated machine-learning model may be comprised of a firmware update, a software update, a autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 304 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 304 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 304 may include, but is not limited to, for example, a cluster of flight controllers in a first location and a second flight controller or cluster of flight controllers in a second location. Flight controller 304 may include one or more flight controllers dedicated to data storage, security, distribution of traffic for load balancing, and the like. Flight controller 304 may be configured to distribute one or more computing tasks as described below across a plurality of flight controllers, which may operate in parallel, in series, redundantly, or in any other manner used for distribution of tasks or memory between computing devices. For example, and without limitation, flight controller 304 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 332. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 304. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 304 may also be implemented using a "shared nothing" architecture in which data is cached at the worker, in an embodiment, this may enable scalability of aircraft and/or computing device. Flight controller 304 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller 304 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 304 as components and/or nodes of a distributer flight controller as described above. For example, and without limitation, co-controller 344 may include one or more controllers and/or components that are similar to flight controller 304. As a further non-limiting example, co-controller 344 may include any controller and/or component that joins flight controller 304 to distributer flight controller. As a further non-limiting example, co-controller 344 may include one or more processors, logic components and/or computing devices capable of receiving, processing, and/or transmitting data to and/or from flight controller 304 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 304 may be designed and/or configured to perform any method, method step, or sequence of method steps in any embodiment described in this disclosure, in any order and with any degree of repetition. For instance, flight controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
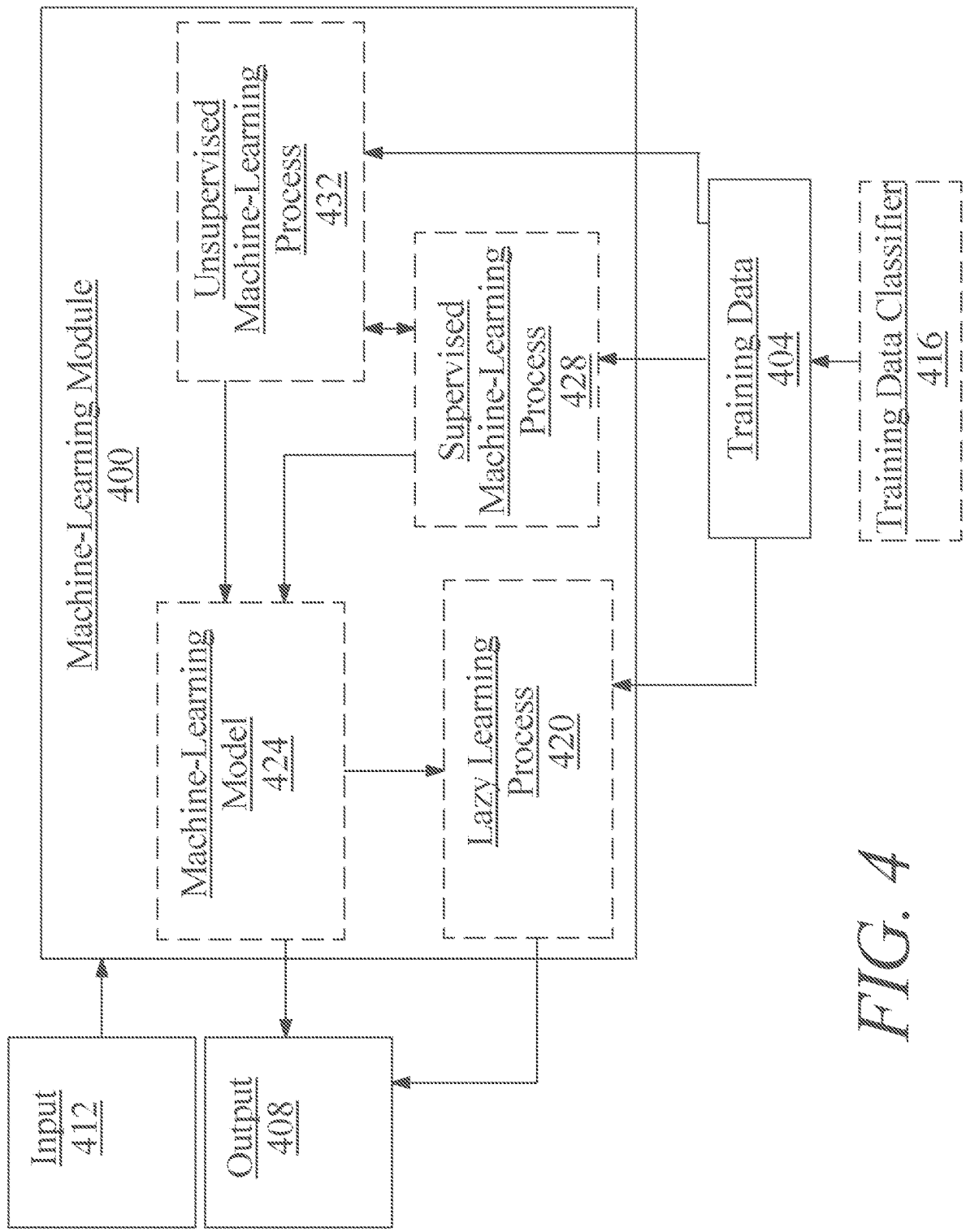
FIG. 4 is an illustrative diagram of a machine learning model.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
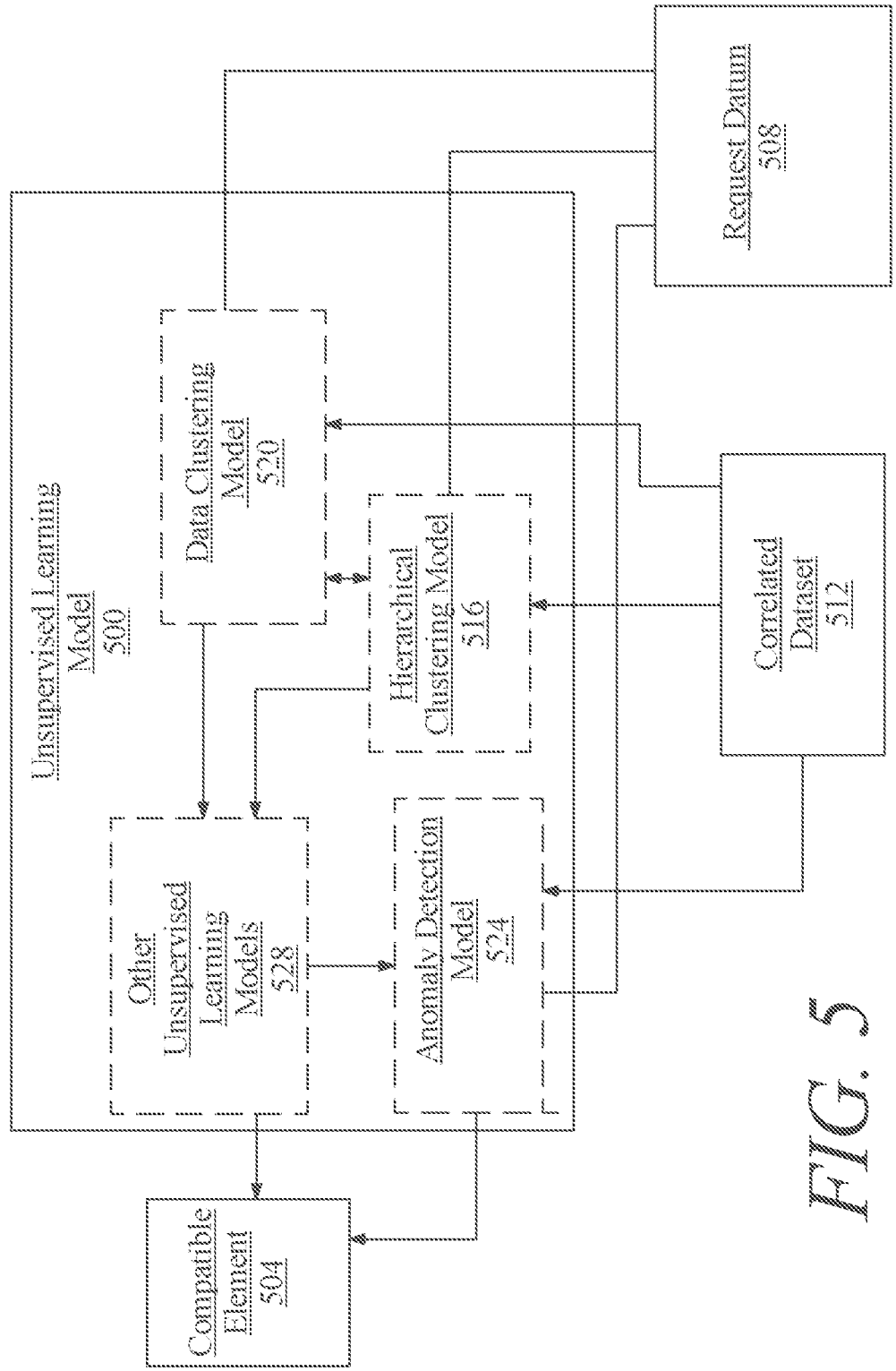
FIG. 5 is an exemplary representation of an unsupervised machine learning model.

Referring now to FIG. 5, an embodiment of unsupervised machine-learning model 500 is illustrated. Unsupervised learning may include any of the unsupervised learning processes as described herein. Unsupervised machine-learning model 500 includes any clustering unsupervised machine-learning model as described herein. Unsupervised machine-learning model 500 generates at least a second correlated compatible element 504. The at least a second correlated compatible element 504 is generated as a function of a request datum 508 and the correlated dataset 512. Correlated dataset 512 may be selected from a database described in this disclosure. Correlated dataset 512 may contain data describing different characteristics of a request datum 508, such as a direction, altitude, command, clearance, maneuver, duration of time, a command, and the like, which may be organized into categories contained within correlated dataset 512. Unsupervised machine-learning model 500 may further include a hierarchical clustering model 516. Hierarchical clustering model 516 may group and/or segment datasets into hierarchy clusters including both agglomerative and divisive clusters. Agglomerative clusters may include a bottom up approach where each observation starts in its own cluster and pairs of clusters are merged as one moves up the hierarchy. Divisive clusters may include a top down approach where all observations may start in one cluster and splits are performed recursively as one moves down the hierarchy. In an embodiment, hierarchical clustering model 516 may analyze datasets obtained from a database to find observations which may each initially form own cluster. Hierarchical clustering model 516 may then then identify clusters that are closest together and merge the two most similar clusters and continue until all clusters are merged together. Hierarchical clustering model 516 may output a dendrogram which may describe the hierarchical relationship between the clusters. Distance between clusters that are created may be measured using a suitable metric. Distance may be measured between for example the two most similar parts of a cluster known as single linkage, the two least similar bits of a cluster known as complete-linkage, the center of the clusters known as average-linkage or by some other criterion which may be obtained based on input received from a database, as an example.

With continued reference to FIG. 5, unsupervised machine-learning model 500 may perform other unsupervised machine learning models to output at least a compatible element 504. Unsupervised machine-learning model 500 may include a data clustering model 520. Data clustering model 520 may group and/or segment datasets with shared attributes to extrapolate algorithmic relationships. Data clustering model 520 may group data that has been labelled, classified, and/or categorized. Data clustering model 520 may identify commonalities in data and react based on the presence or absence of such commonalities. For instance and without limitation, data clustering model 520 may identify other data sets that contain the same or similar characteristics of an element contained within request datum 508 or identify other datasets that contain elements with similar attributes and/or differentiations. In an embodiment, data clustering model 520 may cluster data and generate labels that may be utilized as training set data. Data clustering model 520 may utilize other forms of data clustering algorithms including for example, hierarchical clustering, k-means, mixture models, OPTICS algorithm, and DBSCAN.

With continued reference to FIG. 5, unsupervised machine-learning model 500 may include an anomaly detection model 524, Anomaly detection model 524 may include identification of rare items, events or observations that differ significant from the majority of the data. Anomaly detection model 524 may function to observe and find outliers. For instance and without limitation, anomaly detect may find and examine data outliers such as an expression datum that is not compatible with any elements or that is compatible with very few elements.

Still referring to FIG. 5, unsupervised machine-learning model 500 may include other unsupervised machine-learning models 528. This may include for example, neural networks, autoencoders, deep belief nets, Hebbian learning, adversarial networks, self-organizing maps, expectation-maximization algorithm, method of moments, blind signal separation techniques, principal component analysis, independent component analysis, non-negative matrix factorization, singular value decomposition (not pictured).

Figure 6:
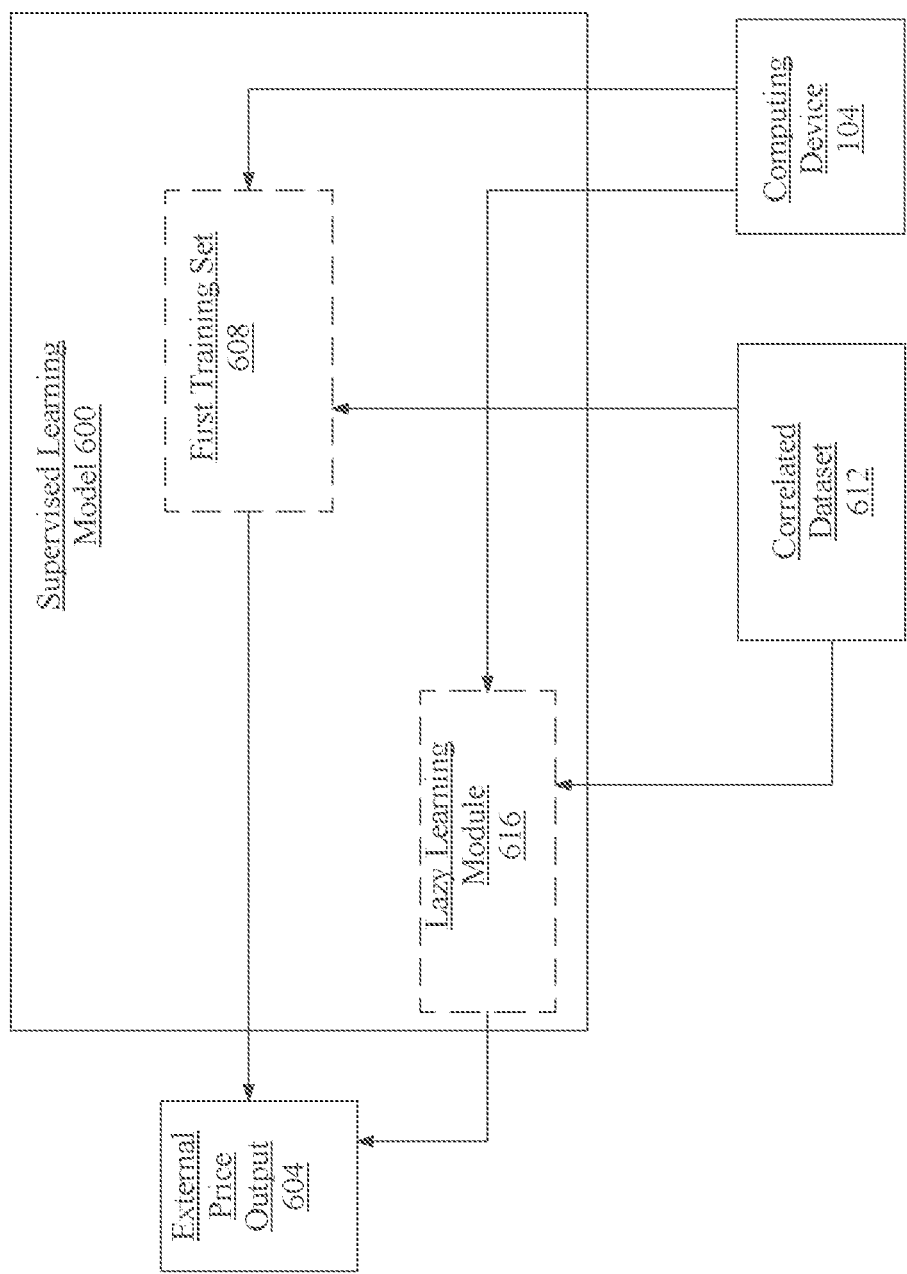
FIG. 6 is an illustrative diagram of a supervised machine learning model.

Referring now to FIG. 6, an embodiment of supervised machine learning model 600 is illustrated. Supervised machine-learning model 600 is configured to generate an external output 604. External output 604 is generated as a function of relating a request datum to at least an element. Supervised machine-learning model 600 generates the external output 604 using first training set 608. Supervised machine-learning model 600 may be configured to perform any supervised machine-learning. This may include for example, support vector machines, linear regression, logistic regression, naïve Bayes, linear discriminant analysis, decision trees, k-nearest neighbor algorithm, neural networks, and similarity learning. In an embodiment, first training set 608 may include the at least a correlated dataset 612. Supervised machine-learning model 600 may be further configured to calculate an external time to perform a command as a function of relating the request datum to the rate of time for performance of each datum of the plurality of datums and to the vehicle being used of the plurality of vehicles configured to perform the command datum.

Continuing to refer to FIG. 6, supervised machine-learning model 600 may generate external output 604 by executing a lazy learning module 616. Lazy learning module 616 is executed as a function of request datum and the at least an element. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" at an at least an element associated with at least a request datum, using at least a training set. As a non-limiting example, an initial heuristic may include an initial calculation of an external output according to relation to data of at least a voice datum, at least a query of at least a request datum, and/or one or more values detected in at least a request datum sample; calculating may include, without limitation, calculating external performance time according to associations between elements of at least a voice datum and compatible elements.

Lazy learning module 616 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate external price outputs as described in this disclosure, including without limitation lazy learning applications of machine-learning algorithms as described in further detail below.

Figure 7:
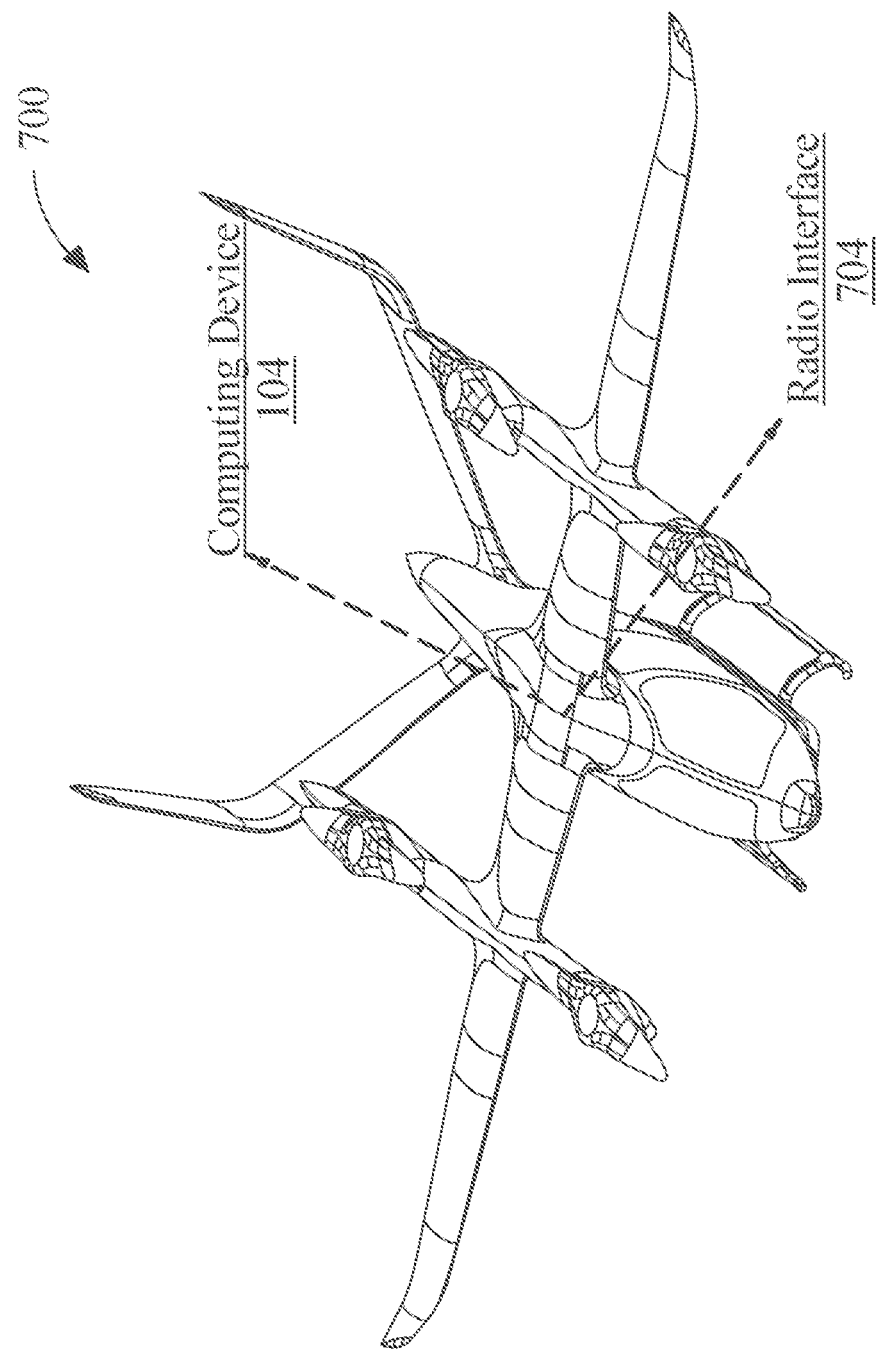
FIG. 7 is an exemplary embodiment of an electric aircraft.

Referring now to FIG. 7, an embodiment of an electric aircraft 700 is presented. Still referring to FIG. 7, electric aircraft 700 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 7, a number of aerodynamic forces may act upon the electric aircraft 700 during flight. Forces acting on an electric aircraft 700 during flight may include, without limitation, thrust, the forward force produced by the rotating element of the electric aircraft 700 and acts parallel to the longitudinal axis. Another force acting upon electric aircraft 700 may be, without limitation, drag, which may be defined as a rearward retarding force which is caused by disruption of airflow by any protruding surface of the electric aircraft 700 such as, without limitation, the wing, rotor, and fuselage. Drag may oppose thrust and acts rearward parallel to the relative wind. A further force acting upon electric aircraft 700 may include, without limitation, weight, which may include a combined load of the electric aircraft 700 itself, crew, baggage, and/or fuel. Weight may pull electric aircraft 700 downward due to the force of gravity. An additional force acting on electric aircraft 700 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 700 are designed to be as lightweight as possible. Reducing the weight of the aircraft and designing to reduce the number of components is essential to optimize the weight. To save energy, it may be useful to reduce weight of components of an electric aircraft 700, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 700 and/or propulsors.

Still referring to FIG. 7, electric aircraft 700 may include a radio interface 704 coupled to the electric aircraft 700. In a nonlimiting example, radio interface 704 may be configured to receive voice datum 108 from, and transmit response datum 132 to, a remote device 112.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
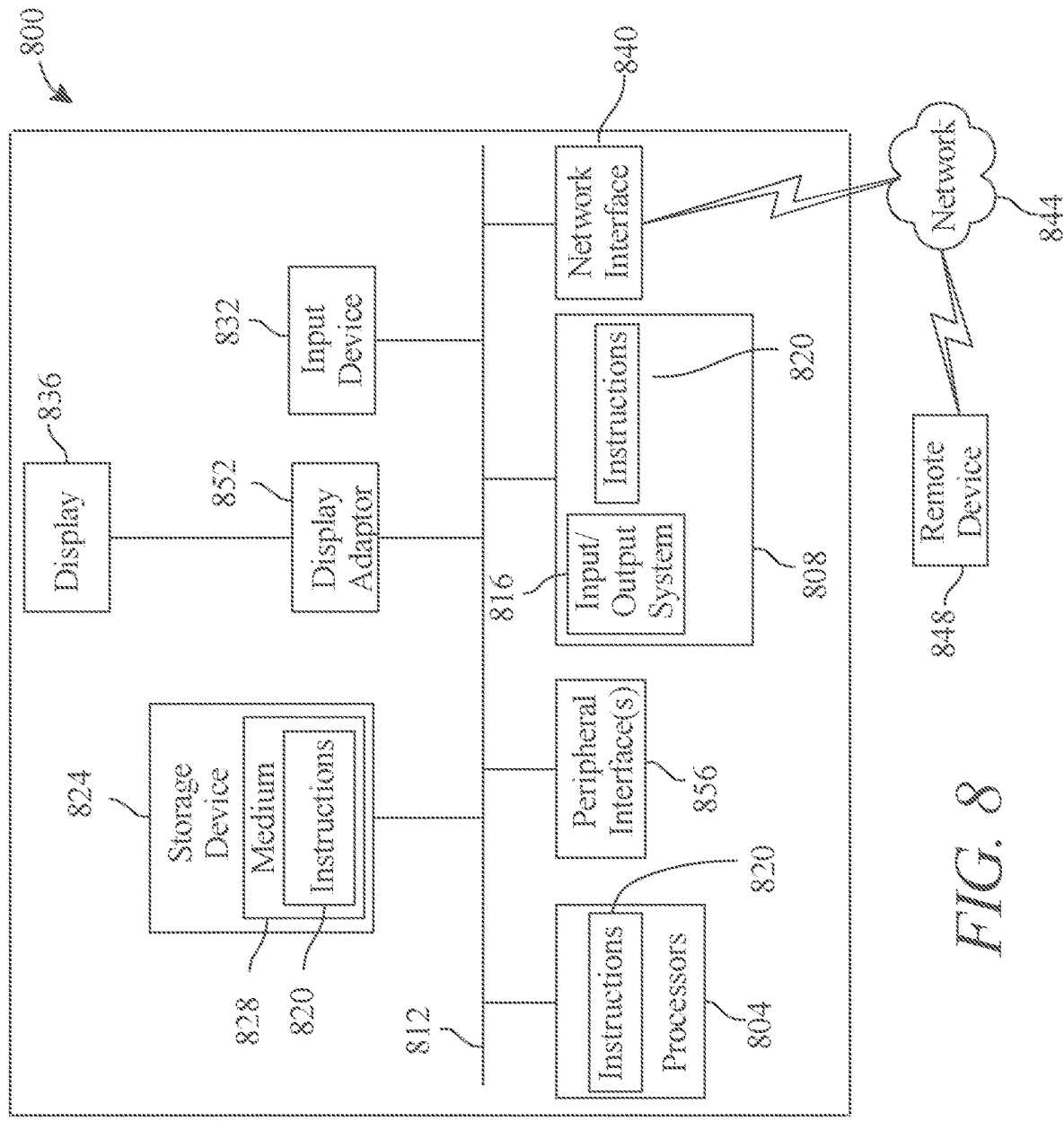
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for voice recognition in autonomous flight of an electric aircraft, the system comprising:
   a computing device communicatively connected to the electric aircraft, the computing device is configured to:
   receive at least a voice datum from a remote device, wherein the voice datum is configured to include at least an expression datum;
   generate, using a first machine-learning process, a transcription datum as a function of the at least a voice datum;
   extract at least a query as a function of the transcription datum;
   generate, using a second machine-learning process, a communication output as a function of the at least a query; and
   adjust a flight plan as a function of the communication output.

2. The system of claim 1, wherein the computing device is further configured to transmit an adjustment notification to an interface device as a function of adjusting the flight plan.

3. The system of claim 2, wherein the system is further configured to include an interface device, wherein the interface device is configured to display the adjustment notification to a user.

4. The system of claim 1, wherein the computing device is further configured to transmit the transcription datum to an interface device.

5. The system of claim 1, wherein generating the transcription datum further comprises:
   selecting a correlated dataset containing a plurality of data entries wherein each dataset contains at least a datum of expression data and at least a first correlated content datum as a function of the at least a voice datum; and
   generating, at a clustering unsupervised machine-learning model, a transcription datum as a function of the at least a voice datum and the correlated dataset.

6. The system of claim 1, wherein the at least a query is extracted at a language processing module.

7. The system of claim 1, wherein generating the communication output further comprises:
   receiving, at a supervised machine-learning model, a first training set as a function of the at least a voice datum and the at least a query; and
   generating, at a supervised machine-learning model, a communication output as a function of relating the at least a query to at least a textual output.

8. The system of claim 1, wherein the computing device is further configured to:
  generate a response datum as a function of the communication output; and
  transmit the response datum to the remote device.

9. The system of claim 1, wherein receiving the voice datum further comprises storing the voice datum in the datastore system.

10. A method for voice recognition in autonomous flight of an electric aircraft, the method comprising:
  receiving, at a computing device, at least a voice datum from a remote device, wherein the voice datum is configured to include at least an expression datum;
  generating, at the computing device, using a first machine-learning process, a transcription datum as a function of the at least a voice datum;
  extracting, at the computing device, at least a query as a function of the transcription datum;
  generating, at the computing device, using a second machine-learning process, a communication output as a function of the at least a query; and
  adjusting, at the computing device, a flight plan as a function of the communication output.

11. The method of claim 10, wherein the method further comprises transmitting, by the computing device, an adjustment notification to a user interface device as a function of adjusting the flight plan.

12. The method of claim 11, wherein the method further comprises displaying, by the user interface device, the adjustment notification to a user.

13. The method of claim 10, wherein the method further comprises transmitting, by the computing device, the transcription datum to a user interface device.

14. The method of claim 10, wherein generating the transcription datum further comprises:
  selecting a correlated dataset containing a plurality of data entries wherein each dataset contains at least a datum of expression data and at least a first correlated content datum as a function of the at least a voice datum; and
  generating, at a clustering unsupervised machine-learning model, a transcription datum as a function of the at least a voice datum and the correlated dataset.

15. The method of claim 10, wherein the at least a query is extracted at a language processing module.

16. The method of claim 10, wherein generating the communication output further comprises:
  receiving, at a supervised machine-learning model, a first training set as a function of the at least a voice datum and the at least a query; and
  generating, at a supervised machine-learning model, a communication output as a function of relating the at least a query to at least a textual output.

17. The method of claim 10, wherein the method further comprises:
  generating, by the computing device, a response datum as a function of the communication output; and
  transmitting, by the computing device, the response datum to the remote device.

18. The method of claim 10, wherein receiving the voice datum further comprises storing the voice datum, as a dataset, in a database.

19. The method of claim 18, wherein the method further comprises training the machine learning process as a function of the voice datum dataset.

20. A system for voice recognition in autonomous flight of an electric aircraft, the system comprising:
  a computing device communicatively connected to the electric aircraft, the computing device is configured to:
    receive at least a voice datum from a remote device, wherein the voice datum is configured to include at least an expression datum;
    extract at least a query from the at least a voice datum;
    generate, using a machine-learning process, a communication output as a function of the at least a query; and
    adjust a flight plan as a function of the communication output.

* * * * *